United States Patent [19]

DuPont et al.

[11] 4,398,879

[45] Aug. 16, 1983

[54] ON-SITE FABRICATING OF PLASTIC PIPE FITTINGS

[76] Inventors: Paul R. DuPont, 104 Mountain Ave., Gillette, N.J. 07933; Craig R. Nelson, 120 Floral Ave., Murray Hill, N.J. 07074

[21] Appl. No.: 275,412

[22] Filed: Jun. 19, 1981

[51] Int. Cl.[3] .............................................. B29C 17/00
[52] U.S. Cl. .................................................. 425/392
[58] Field of Search ................ 425/392; 264/296, 322

[56] References Cited

U.S. PATENT DOCUMENTS 2,876,496  3/1959  Murphy .......................... 264/322 X
4,175,917 11/1979  Cotten ............................. 425/392 X
4,234,301 11/1980  Hayes .................................. 425/392

Primary Examiner—Thomas P. Pavelko

[57] ABSTRACT

A portable apparatus for reforming plastic pipe ends is disclosed. The apparatus includes a heat sink clamp and depth collar for locating said clamp a predetermined distance from the end of the plastic pipe end. This heat sink clamp substantially limits axial heat penetration from an oven into the plastic pipe so as to permit the reshaping of the pipe end into a sanitary flow end, i.e. an end having imperfection-free contours.

7 Claims, 8 Drawing Figures

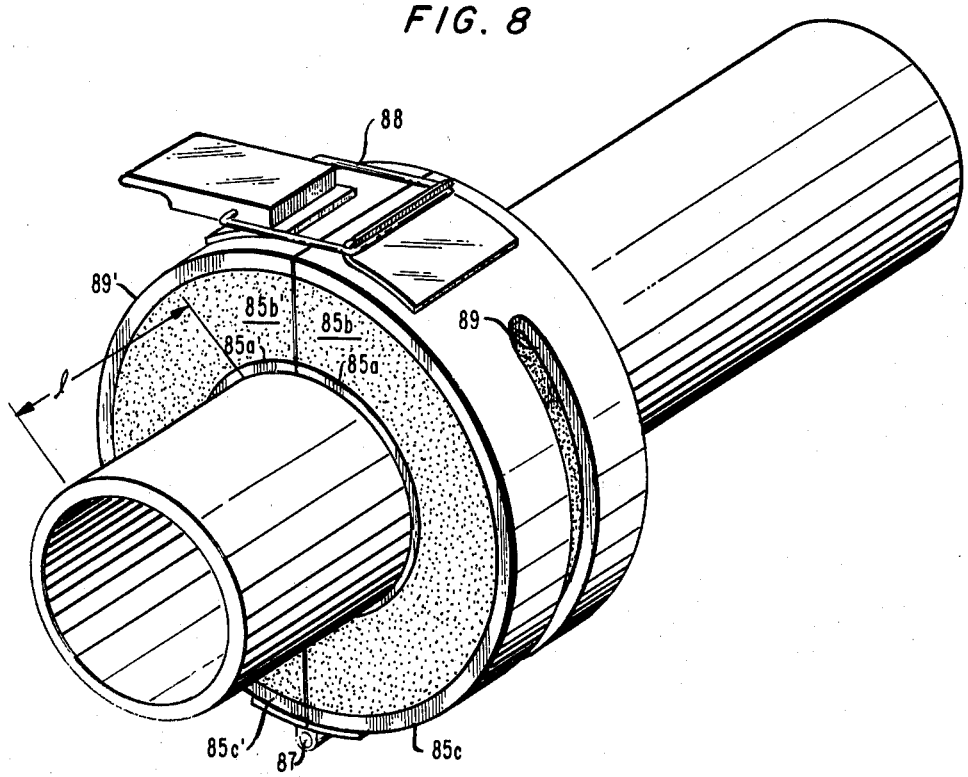

ON-SITE FABRICATING OF PLASTIC PIPE FITTINGS

TECHNICAL FIELD

This invention relates to sanitary plastic piping for the food processing industry and, more particularly, to apparatus and methods for more conveniently fabricating on-site plastic pipe fittings which will meet sanitarian standards.

BACKGROUND OF THE INVENTION

Sanitary piping as used in the food processing industry is primarily characterized by the requirement for corrosion resistance and stream-line fluid flow free of crevices and traps into which particulate matter that may be carried by the fluid stream might accumulate. To fill this need, the food and beverage industry makes extensive use of smooth bore sanitary piping that is almost exclusively made of stainless steel, monel or other corrosion resistant metallic alloys. These piping installations normally include a number of quick-connect/disconnect fittings to permit critical sections of the pipe to be dismantled for periodic cleaning, replacement, or inspection so that the sanitary integrity of the food processing system can be maintained.

Although stainless steel and monel pipes are usually thought to be corrosion resistant, problems have been encountered when brine and various acids are significant constituents of the fluid carried by the piping system. Certain foods such as catsup and bar-b-que sauce and those having a garlic content are also known to be troublesome. The corrosion problem is further aggravated by the periodic need to use clean-in-place solutions to remove possible pockets of accumulated organic matter. Through the combined effects of reactive food materials and such cleaning solutions, replacement of corrosion resistant piping is an on-going periodic activity.

Of course, there are several plastic materials which offer better corrosion resistance than metallic alloy pipes and which being transparent would permit in-place interior inspection without disassembly. Further, the use of plastic piping which permits the use of microwave heating of the fluid stream would permit different and more advanced methods of food processing to be employed.

The introduction of plastic pipe sections into the food processing industry has heretofore been inhibited by several factors. Sanitarians have not approved the use of solvents to glue together pipe sections in the manner commonly utilized to install ordinary household and industrial plumbing. The strict prohibitions against crevices and traps into which particulate matter carried in the fluid stream rule out the use of conventional plastic fittings. While it is conceivable that plastic fittings having the appropriate internal contours to satisfy sanitary flow requirements could be fabricated in analogous fashion to the presently available metal fittings, there are no known welding techniques avaliable for attaching such plastic fittings. The fatory casting of sanitary flow end-connections on pipe lengths also does not seem to be feasible in view of the myraid lengths and shapes of pipe runs to be supplied in practice. Accordingly, while it would appear to be extremely advantageous to employ plastic piping in sanitary-flow installations, there has not yet been devised a practical method for permitting appropriate piping connections to be made in the field.

SUMMARY OF THE INVENTION

In accordance with the principles of the present invention, we have devised a portable apparatus, suitable for table or work bench mounting, which facilitates the on-site, field fabrication of sanitary flow plastic pipe connections. This apparatus makes advantageous use in the field of certain properties exhibited by plastic pipe which has been factory extruded. In the normal fabrication of extruded plastic pipe, the extruder exit die diameter is usually larger than the final pipe diameter by an amount determined by the "draw down" through the sizing die. In being pulled through the dies, the pipe partially cools and certain stresses are locked-in. It has been discovered that, by controllably reheating a predetermined length of the end of the plastic pipe, the stresses that were induced in the skin of the pipe during its original extrusion may be relieved to produce self-flaring of the pipe end wall between its inner and outer diameter "skin" surfaces. This self-flaring is believed to be occasioned by the different stresses locked into the two skin surfaces so that when the stresses are relieved, the two surfaces bend to different radii. By limiting the longitudinal extent of reheat, the expanded end-wall may be subjected to embossing and forming dies to produce the contours of a sanitary flow pipe connection analogous to those exhibited by corresponding metallic pipe connections.

In the illustrative embodiment, the selective reheating for producing the expanded end-wall and the predetermined degree of longitudinal softening is conveniently achieved through the use of a special oven, insulated clamp and heat sink arrangement located at one station of a portable work table apparatus. A snap-on depth collar is first placed on the plastic pipe to be reformed so as to admit a predetermined longitudinal length of the pipe end to the first station. The pipe is then inserted into the heat sink block which comprises two split sections. The first section includes a massive, highly thermally conductive aluminum body plate having a split aperature dimensioned to intimately embrace the outer diameter of the pipe. The section is dimensioned similarly to the first section but is of an insulating material such as "Marinite". The depth collar and thickness of the heat sink are proportioned so that with the pipe end inserted through the heat sink until the collar contacts the aluminum plate, a sufficient length of the pipe end protrudes through the insulating plate of the heat sink block to be admitted to the oven. After being admitted to the oven for a sufficient time, the pipe and attached heat sink is transferred to the flange-forming station of the work table and clamped. A die having the appropriate contours to emboss the expanded end-wall is then advanced to meet and suitably form the exposed pipe end. Advantageously, these contours include a semi-annular ring to form an O-ring recess in the pipe flange analogous to the conventional quick-connect metallic pipe fittings used in sanitary flow piping. The end section thus formed on the plastic pipe is such that the plastic section is fully interchangeable with metallic sanitary piping.

It is to be noted that unlike prior art arrangements for post forming plastic pipe ends, the apparatus of the invention controls the reheating and forming to preserve the dimensions and surface integrity of the pipe's inner diameter. Accordingly, sanitary flow geometry is maintained not only throughout the length of the pipe, but also in the vicinity of the pipe connection. In such an integrally formed connection, there are no pockets in which particulate matter could accumulate. In the illustrative embodiment, even heating about the circumference of the pipe end is facilitated by the special oven which includes a fan to overcome temperature differentials which would otherwise arise from the natural convection of the air being heated in the oven space.

BRIEF DESCRIPTION OF THE DRAWINGS

The foregoing and other objects and features of the invention are described in detail in the ensuing specification and drawings in which:

FIG. 8 shows an alternative heat sink block assembly clamped to a length of plastic pipe so as to eliminate the need for a separate depth collar.

DETAILED DESCRIPTION

Figure 1:
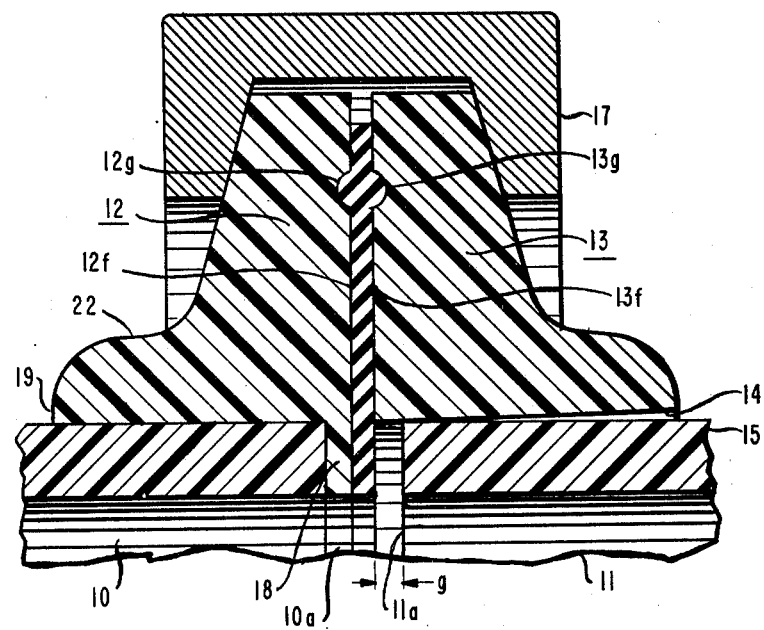
FIG. 1 shows an enlarged cross-sectional view of a hypothetical plastic pipe joint illustrating two different types of flange couplings and demonstrating the problems which can arise when non-integral fittings are employed.

In FIG. 1, an attempt has been made to depict how two lengths of extruded plastic pipe, 10 and 11, might be coupled together by following, in plastic, techniques similar to those employed when joining lengths of metallic piping. Pipe 10 has affixed thereto a plastic flanged ferrule 12, and pipe 11 has affixed thereto a somewhat different plastic ferrule 13, each ferrule having a hypothetical design based on a comparable metallic fitting known in the art. The two flanges are urged together by conventional steel clamp 17. The inner circumference 14 of ferrule 13 is tapered to make a tight frictional engagement with the outer circumference 15 of pipe 11. Whatever glue or adhesive is required to be used between 14 and 15 to assure a firm bonding and fluid sealing of ferrule 13 to pipe 11 has not been shown. Because of unavoidable differences in production dimensional tolerances, the end 11a of pipe 11 will usually find itself positioned a somewhat variable and indeterminate distance g behind the parting face 13f of ferrule 13. Accordingly, an annular "pocket" of length g and having a depth determined by the wall thickness of pipe 11 may be left into which particulate matter carried by the fluid stream transported by the piping system may accumulate.

The annular gap may, of course, be obviated by making the taper of inner circumference 14 shallower than that shown, but this may allow the end 11a of pipe 11 to project beyond parting face 13f, requiring the excess to be machined off. While this manner of construction might avoid the creation of an annular pocket 15, the machining operation is a definite inconvenience.

A further alternative type of attachable flange arrangement is shown on pipe 10 which uses a plastic flange 12 that is provided with an internal lip 18 which meets the end 10a of pipe 10 to somewhat more accurately locate pipe end 10a with respect to parting face 12f of flange 12 than was possible between pipe end 11a and parting face 13f. However, the accuracy of the result depends on a smooth, right-angle cut off of pipe 10. Furthermore, the secure bonding ferrule 12 to pipe 10 must depend on the use of some hypothetical glue or adhesive which would be sufficiently strong and non-toxic and be free of solvent residue and thereby qualify for sanitarian approval. Whereas metallic pipes may be rather accurately and non-corrosively butt-welded or swaged together and metallic flanged ferrules butt-welded or swaged to metallic pipe sections in such a manner as to produce smooth interior bores, no such techniques are available for attaching plastic flanges to plastic pipe. We have discovered, however, that it is not necessary to attach flanges at all and that suitable flanges may be produced on the job site out of ordinary pipe sections.

Figure 2:
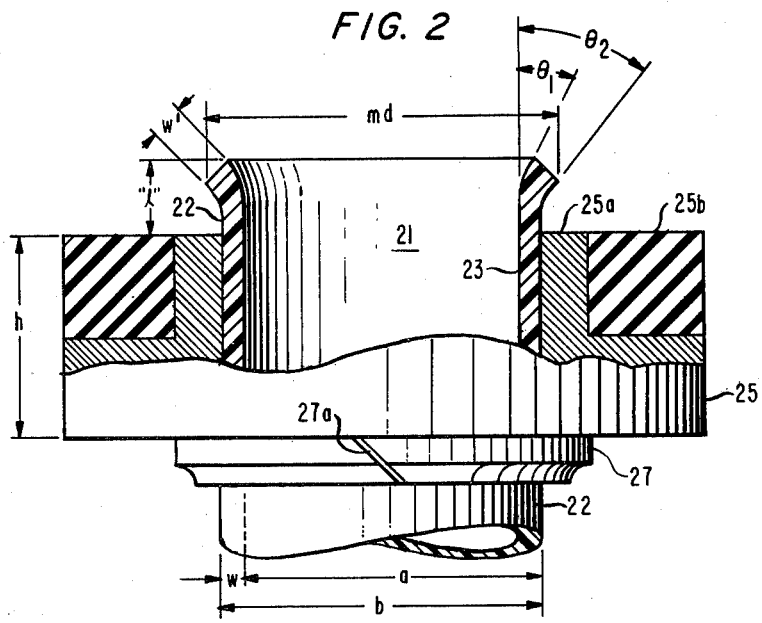
FIG. 2 shows a partial sectional view of a controllably reheated end portion of a length of plastic pipe positioned in the heat sink block prior to embossing.

FIG. 2 is a partial cross-sectional view of the end of a conventionally extruded plastic pipe 21 that has been positioned in the heat sink block 25 of the illustrative embodiment and controllably reheated in the oven (FIG. 6) of the illustrative embodiment. The reheating has relieved the draw-down stresses that were locked into the pipe during its original extrusion from the exit die (not shown) of the extrusion machine (also not shown, but well-known). Prior to being heated, a snap ring depth gage collar 27 is attached to plastic pipe 21 at a longitudinal distance "l"+h from the pipe end. Referring now to FIG. 4, the pipe 21 is inserted into heat sink block 25 until collar 27 makes contact with the heat sink block. An axial length "l" (FIG. 2) then protrudes beyond the opposite surface of heat sink 25. The length "l" of pipe 22 will then be exposed to the heat of oven 60 (see assembly view, FIG. 3) but the heat sink 25 will limit longitudinal heat penetration. The limitation of the reheating and stress-relieving to the axial length l produces a different degree of bending in the outer pipe skin 22 than in the inner pipe skin 23. This different degree of bending causes the end wall to become flared to a thickness w' which exceeds the normal, cool wall thickness w of the unheated pipe. Limiting of heat penetration is important to the forming of a sanitary flow coupling. Enough heat must be applied to the end wall to provide the flared width w' uniformly about the pipe circumference wiithout allowing so much of the axial length of pipe 22 to become softened that the inner skin 23 becomes wavy.

To limit the longitudinal heat penetration to the axial length "l", heat sink block 25 conprises a pair of high thermal conductivity body portions 25a, 25a' fabricated advantageously of aluminum which are clamped together under the urging of clamping screw 41, FIG. 4, to intimately embrace the outer circumference of pipe 22. The front face of block 25, which will face oven 60, is relieved for a considerable portion of its overall axial depth h to accomodate a split heat shield 25b, 25b' advantageously fabricated of Marinite or similar material. Heat shield 25b, 25b' insulates the aluminum bodies 25a, 25a' against direct radiant heating by oven 60 when the pipe length "l" is introduced into the oven cavity 66.

Figure 4:
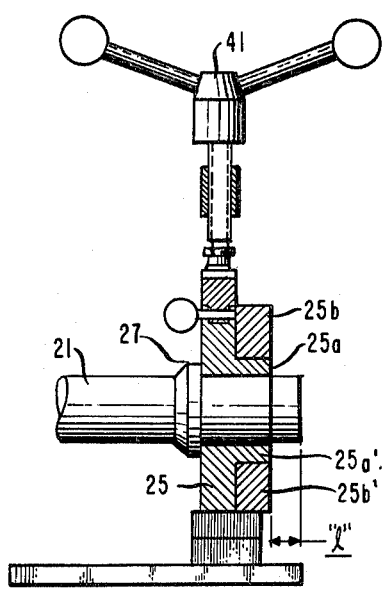
FIGS. 4 and 5 show a partial sectional side and an end view of the heat sink block and clamp assembly.
Figure 5:
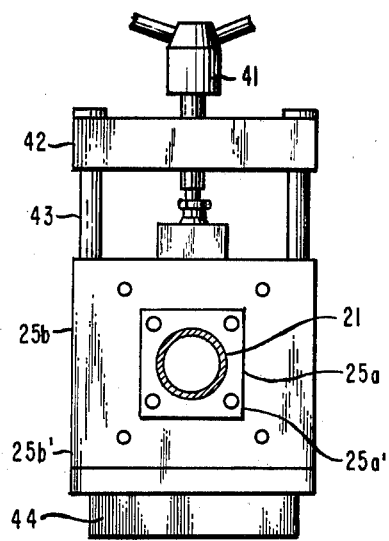

FIG. 8 shows an alternative heat sink block device which eliminates the need for a separate depth collar 27. The split halves of the heat sink are hingeably attached to one another by hinge 87 and quick connect cam and hasp assembly 88. The inner metallic portions 85a and 85a′ correspond to inner metallic portions 25a and 25a′ of FIGS. 2, 4 and 5 while the thermal insulating portions 85b and 85b′ correspond generally to thermal insulating portions 25b and 25b′ of FIGS. 2, 4 and 5. In addition, however, an outer circular strap member 85c–85c′ has been provided to which hinge 87 and cam and hasp assembly 88 are affixed. A pair of secant-like grooves 89–89′ have been cut through the perimeter of heat sink 85 to permit engagement with posts 43, FIG. 5 of the heating work station 33, FIG. 3; thus accurately and conveniently positioning the pipe end therein.

Figure 3:
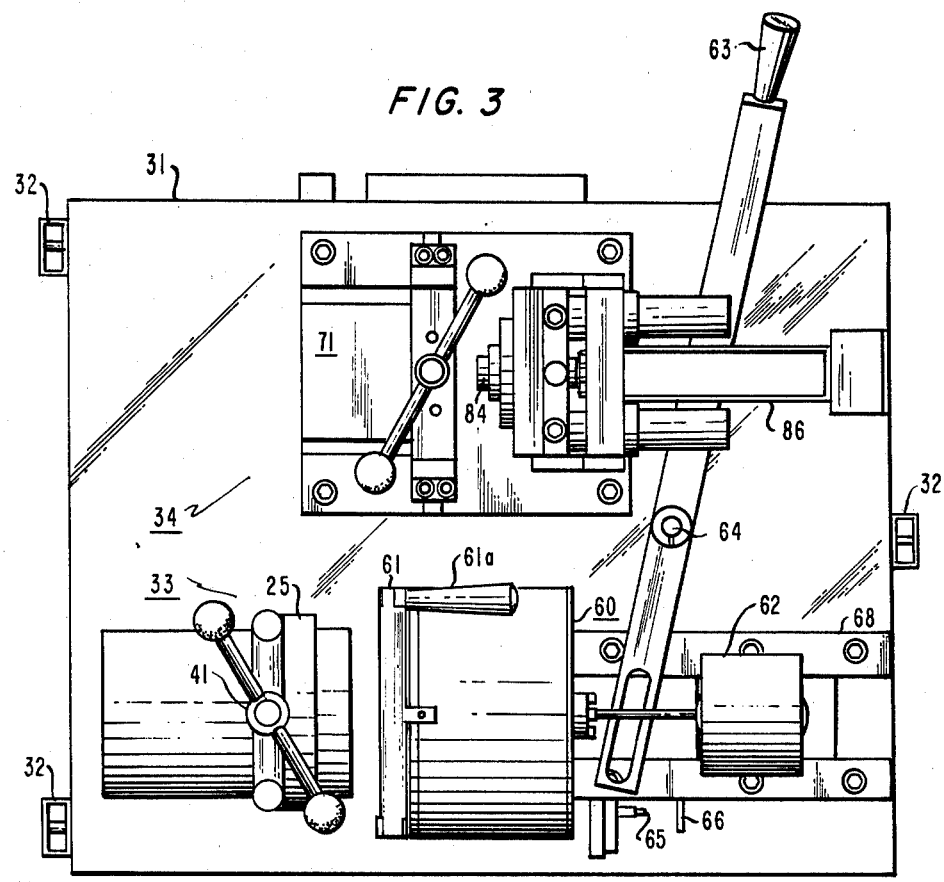
FIG. 3 shows a top view of the portable plastic pipe forming apparatus of the illustrative embodiment.
Figure 7:
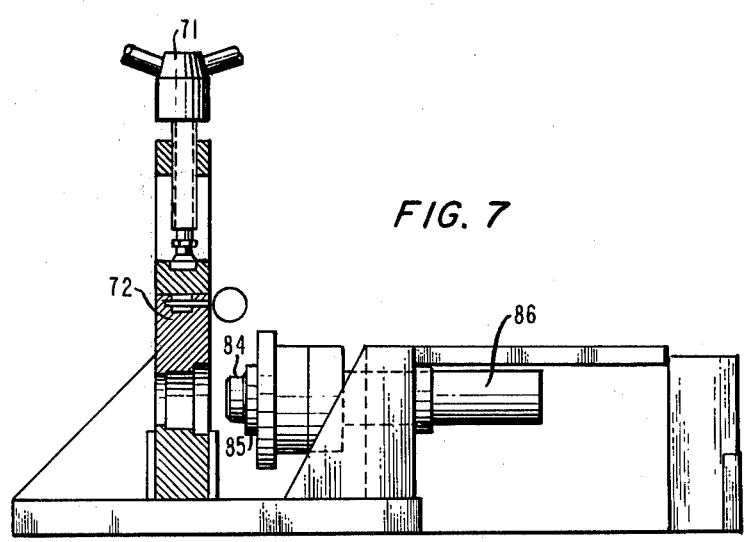
FIG. 7 shows a partial sectional view of the ram and die assembly of the illustrative embodiment.

Referring to FIG. 3, there is shown a top assembly view of the portable apparatus comprising the illustrative embodiment. A portable metallic work table 31 includes three detachable support legs 32 and two work stations 33 and 34. The first work station 33 includes the heat sink block 25 together with a clamp assembly 41 (shown in greater detail in the cross-sectional view of FIG. 4 and end view FIG. 5) and a slideably mounted oven 60, 61 and fan motor 62 (shown in greater detail in cross-sectional view FIG. 6) and slide bar 63 assembly. The second work station includes clamp 71 and female die 72 assembly and male die 84 and ram assembly 86 (shown in greater detail in the cross-sectional view FIG. 7).

Figure 6:
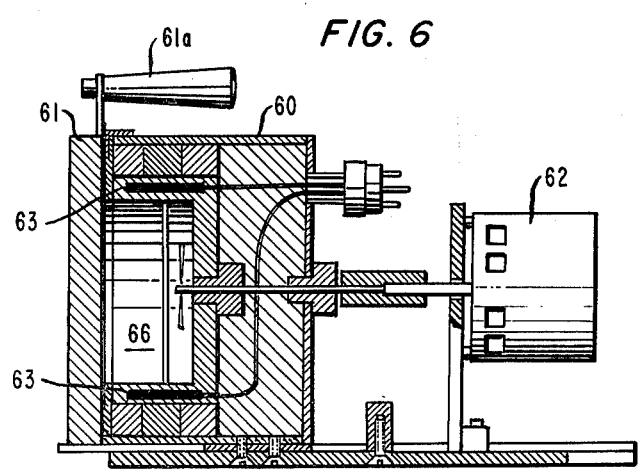
FIG. 6 shows a partial sectional view of the oven and fan assembly.

In operation, a switch (not shown) is closed and thermostatically controlled electric current is supplied to the cartridge heaters 63, FIG. 6, of oven 60 and to the fan motor 62 to preheat the oven. The snap ring depth gauge collar 27 is placed on pipe 21, as shown in FIG. 2, to allow a suitable length "l" of plastic pipe to protrude through heat sink block 25. Clamp 41, FIG. 4, is then made up so that its aluminum thermally conductive halves intimately embrace the outer circumference of pipe 21.

Handle 61a is then grasped and the oven door slide 61 is lifted vertically (perpendicular to the plane of FIG. 3) exposing the cylindrical inner cavity 66 (see FIG. 6) of oven 60 facing heat sink 25. Oven door slide 61 is advantageously fabricated of "Marinite" or other heat insulating material. While its use is not critical to the operation of the invention, oven door slide 61 conserves oven heat and reduces energy expenditure.

Slide bar 65 is then manually thrust to the right (clockwise) about pivot 64 causing oven 60 and fan motor 62 to traverse leftwards along ways 68 toward heat sink 25 and clamp 41 until tab 66 contacts limit stop 65. The inner diameter of oven cavity 66 is at least 30 to 50% larger than the maximum diameter b (FIG. 2) of pipe to be heated. Fan 62f, located within oven cavity 66, is turned by motor 62 to evenly distribute the air being heated within cavity 66 thereby overcoming the tendency of the heated air to accumulate in the upper portion of the oven cavity.

When pipe end 21 has been heated for a suitable length of time, clamp 41 is loosened separating the halves 25a, 25a′ and 25b, 25b′ of the heat sink block 25. Pipe 21 is removed from the heat sink and transferred to work station 34 and inserted into clamp and female die assembly 71, 72. Advantageously, the depth collar 27 also serves to axially correctly position pipe 21 in die 72 prior to the tightening of clamp 71. When clamp 71 is made up to secure pipe 21, ram and die assembly 84, 86 is actuated causing ram 86 to drive male die 84 in such a manner that die ring 85 (FIG. 7) embosses the flared width w′ (FIG. 2) with the hemitoroidal groove 12g (see FIG. 1) so the parting face 12f may receive a conventional sanitary flow O-ring seal. Advantageously, the contours of the female die 72 also emboss the external surface 22 of pipe 12 with the flange contour 19 (FIG. 1) of the type conventionally used with flanged sanitary steel piping. Accordingly, the flange member 12 has been formed integrally with and of pipe 10 in such a manner that there is no annular gap or crevice into which particulate matter may accumulate.

For example, the controlled heating of a 9/16 inch length l of polypropylene pipe having a cold outer diameter b of 2.125 inches and a cold inner diameter a of 1.875 inches (cold wall thickness, w, of 0.125 inches) produces a bending angle $\theta$ of 30° of the inner pipe skin 23 and a bending angle $\theta_2$ of 45° of the outer pipe skin 22. In this example, a maximum outer diameter md at the flared-end of the pipe was 2.34 inches, the axial depth h of the heat sink block 25 was approximately 2 inches and the Marinite heat shield 25b had an axial depth of approximately 1 inch.

What is claimed is:

1. A portable plastic pipe-end reforming apparatus comprising a planar table having mounted thereon an oven having a uniformly heated internal cavity for accommodating therein a range of different pipe diameters, segmented heat-sinking clamp means including a thermal barrier portion disposed opposite said oven cavity and a highly thermally conductive section for intimately embracing a predetermined length of said plastic pipe, said heat-sinking clamp means being adapted to sharply limit the axial heat penetration from said oven into said plastic pipe and a forming station having a die for embossing a sanitary flow pipe contour parting surface on said pipe end.

2. A pipe-end reforming apparatus according to claim 1, further including depth collar means for defining a further length of said pipe, said collar being adaptable to embrace said pipe from the end thereof to locate said heat-sinking clamp means and being removable to permit said further length of said pipe-end beyond said predetermined length embraced by said heat-sinking clamp means to protrude into said oven cavity, said clamp means limiting said axial heat penetration substantially solely to said further length.

3. A pipe-end reforming apparatus according to claim 2, wherein said oven includes a plurality of thermostatically controlled heating elements and a motor driven fan for evenly distributing the air heated in said cavity by said heating elements.

4. A pipe-end reforming apparatus according to claim 2, wherein said heat sinking clamp means is dimensioned to have said highly thermally conductive section embrace said predetermined length and said depth collar is positioned to define said further length so that said end of said pipe protruding into said oven is approximately one-fifth of said predetermined length.

5. A pipe-end reforming apparatus according to claim 2, wherein said oven is slidably mounted on said table and wherein said pipe-end is heated in said oven cavity to relieve the original extrusion stresses therein over said length protruding into said oven cavity when said oven is advanced toward said heat sinking clamp means.

6. A pipe-end reforming apparatus according to claim 1, wherein said heat sinking clamp means comprises a receptacle affixed to said table opposite said oven cavity, detachable block means insertable into said receptacle, said block means having separable segments contoured to match the outer circumference of said pipe, and clamp means for bringing said contoured segments into intimate contact with said outer circumference of said pipe.

7. A portable apparatus for reforming the end of an originally extruding plastic pipe to the contours of a sanitary flow pipe section, comprising:
 a planar table having an oven including a uniformly heatable internal cavity,
 means including a heat sink clamp and depth collar for locating said clamp a predetermined axial length from the end of said plastic pipe,
 positioning means for introducing said predetermined axial length of said plastic pipe projecting into said oven cavity for the uniform relieving of extrusion-induced stresses in said pipe,
 and a forming station for embossing a sanitary flow pipe contour having a sharply defined parting surface (12f, 12g or 13f, 13g) into said stress-relieved end portion of said pipe and for defining a sanitary flow external flange contour (22) on the external periphery thereof.

* * * * *